Patented May 17, 1938

2,117,344

UNITED STATES PATENT OFFICE 2,117,344

COCOA AND SUGAR COMPOUND AND PROCESS OF MAKING SAME

Herbert T. Middleton, Englewood, N. J., assignor to International Patents Development Company, Wilmington, Del., a corporation of Delaware No Drawing. Application July 13, 1936,
Serial No. 90,340

4 Claims. (Cl. 99—23)

This invention relates to the production of a dry, powdered chocolate or cocoa and sugar compound of such character as to be readily miscible with and suspendable in a liquid. A compound of this sort may be evenly dispersed through and suspended in cold milk by stirring with a spoon. It is not necessary to heat the milk or to use a mechanical agitator.

A compound of this character and process of making the same are disclosed and claimed in my copending application Serial No. 757,194, filed December 12, 1934.

The object of the present invention is to make certain improvements upon the product and process of the aforementioned application.

Specifically one of the objects of the invention is to provide a compound, of the type described, which is richer in cocoa and equivalent in sweetness to cocoa-sugar compounds heretofore produced.

A further object is to provide a cocoa-sugar compound in which the sugar phase consists of both dextrose and sucrose and which compound is hard enough to grind properly.

In carrying out the invention powdered chocolate or cocoa, preferably cocoa (that is chocolate containing from about 10% to about 20% of fats) is coated or loaded with sugar, that is, the cocoa particles are covered by coatings of sugar, preferably dextrose sugar rather than sucrose because of the superior dietetic characteristics, lesser degree of sweetness and better flavor, of the product when dextrose is used as a sugar. Dry powdered cocoa, because of its fat content and its light and fluffy character, is miscible with cold liquids, such as milk, only with considerable difficulty. The powder repels water, is not readily wetted when put into a liquid and tends to rise to the top of the liquid and to float there as partly dry and agglomerated masses. The loading or coating of the cocoa particles with sugar appears to give them weight and magnitude that facilitates even distribution and intimate mixing or emulsification with the liquid. The dissolving of the sugar which coats or is associated with the individually dispersed cocoa particles insures the wetting of the particles separately and consequently the maintenace of the solids in suspension.

In carrying out the invention a syrup is formed by heating dextrose and water to a temperature between 230° and 280° F. which will give the syrup a concentration represented by water content of 8% to 3%. The syrup while hot is mixed in any suitable manner with dry powdered cocoa. Preferably the cocoa is introduced into the syrup and the syrup brought to a boil. The material is then put into a mixer and thoroughly mixed. This procedure, involving the intense heating of the syrup cocoa mixture, improves the flavor and aroma of the beverage. A small amount of lecithin, which has first been melted by gentle heating, is added to the chocolate and syrup mixture, preferably during the latter part of the mixing operation. The mixture is then poured into shallow pans or trays and allowed to crystallize and cure for from 16 to 48 hours, that is until the cakes are hard enough for grinding. The cakes are then removed from the pans and ground to a fine powder which is preferably sifted to remove lumps. Thereafter, a small quantity of tri-calcium phosphate is added to and mixed into the powder, which may then be put into suitable containers.

The following are specific examples of the process which, however, should be considered as typical and illustrative and not as limiting the invention to the details specified:

*Example 1.*—Forty-three pounds of dextrose hydrate (cerelose) is mixed with two gallons of water in a steam jacketed kettle and heated to a temperature of 270° F. The syrup at this concentration is poured upon nine and three-quarter pounds of powdered cocoa, having a fat content of 12% to 14%, which has been placed in a suitable mixing device provided with an agitator and preferably with heating means. A part of the syrup may be first mixed with the cocoa and then the rest of the syrup introduced into the preliminary mixture. In any case the hot syrup and dry cocoa are thoroughly mixed together so that the cocoa particles are dispersed as uniformly as possible through the syrup.

During the latter part of the mixing operation one quarter pound of lecithin, previously melted, is stirred into the mixture.

Any suitable flavoring extract may also be added to the mixture in the mixing machine. For example there may be added, in the specific example given, 15.89 grams of vanillin and 1.13 grams of coumarin.

While the mixture is still mobile it is drawn into pans where it is allowed to remain until the cakes are hard enough for grinding. The cakes are then removed from the pans and ground to a fine powder, preferably fine enough so that the major portion of the material will pass through a screen having 30 meshes to the linear inch.

After the material has been sifted in this manner, with the tailings returned to the mill for regrinding, one-half pound of tri-calcium phosphate is added and thoroughly mixed into the powder.

The product will have a mosture content of 3% to 5%. At this moisture content and with the amount of tri-calcium phosphate added any tendency of the powder to cake in the containers is counteracted.

The product compounded as just described will have the following composition, approximately, dry basis but including water of crystallization:

|  | Percent |
| --- | --- |
| Dextrose hydrate (cerelose) | 79.0 |
| Cocoa | 19.425 |
| Lecithin | 0.5 |
| Tri-calcium phosphate | 1.0 |
| Vanillin | 0.07 |
| Coumarin | 0.005 |
|  | 100.000 |

This analysis is to be regarded merely as typical and illustrative and not as limiting the invention to the particular proportions given.

*Example 2.*—In case a compound richer in cocoa and equivalent in sweetness to the product of Example 1 is required, sucrose may be substituted in part for dextrose; but in that case in order to obtain a compound hard enough to grind properly, one sugar must predominate over the other to the extent represented by weight percentages of substantially 75 to 25. That is, the sugar must consist either of 75% sucrose or more or 75% dextrose or more. If a high percentage of cocoa is required and, at the same time, considerable sweetness, the batch may consist (in addition to the lecithin, tri-calcium phosphate and flavoring extracts) of 35% cocoa, 16.25% dextrose and 48.75% cane sugar. If less sweetness or a smaller amount of cocoa in the compound is desired, the sugars may be in proportions of 75% dextrose or more and 25% sucrose or less.

The intention is to cover the invention as broadly as the state of the art warrants within the scope of the appended claims.

I claim:

1. Powdered chocolate-sugar compound in which the sugar element consists of dextrose and sucrose with one such sugar predominating to the extent of substantially at least 75%.

2. Process of making a dry powdered chocolate and sugar compound which consists in mixing the chocolate with water and with sucrose and dextrose, one of which sugars is present in at least three times the quantity of the other; allowing the sugars to crystallize; and then hardening and grinding the crystallized product.

3. Powdered chocolate-sugar compound in which the sugar element consists of substantially 75% dextrose and 25% sucrose.

4. Powdered chocolate-sugar compound in which the sugar element consists of substantially 75% sucrose and 25% dextrose.

HERBERT T. MIDDLETON.